United States Patent
Sheoran et al.

(10) Patent No.: US 6,520,738 B2
(45) Date of Patent: Feb. 18, 2003

(54) PLENUM ENTRY BULK SWIRL GENERATOR

(75) Inventors: Yogendra Y. Sheoran, Scottsdale, AZ (US); Bruce D. Bouldin, Phoenix, AZ (US)

(73) Assignee: Honeywell International, Inc., Morristown, NJ (US)

(*) Notice: Subject to any disclaimer, the term of this patent is extended or adjusted under 35 U.S.C. 154(b) by 0 days.

(21) Appl. No.: 09/809,588

(22) Filed: Mar. 15, 2001

(65) Prior Publication Data

US 2002/0131862 A1 Sep. 19, 2002

(51) Int. Cl.[7] ............................................. F01D 25/00
(52) U.S. Cl. .......................................................... 415/205
(58) Field of Search ................................. 415/205–206, 415/208.1, 221, 224, 119, 914, 182.1, 203; 60/269, 726; 13/3 A

(56) References Cited

U.S. PATENT DOCUMENTS

| | | |
|---|---|---|
| 2,694,357 A | 11/1954 | Lee |
| 3,033,491 A | 5/1962 | Clark |
| 3,421,446 A * | 1/1969 | Strscheletzly et al. ... 415/182.1 |
| 3,432,123 A | 3/1969 | Conway et al. |
| 4,174,083 A | 11/1979 | Mohn |
| 4,245,803 A | 1/1981 | DeBlois |
| 4,378,097 A | 3/1983 | Ferguson et al. |
| 4,381,017 A | 4/1983 | Bissinger |
| 4,418,879 A | 12/1983 | Vanderleest |
| 4,418,880 A | 12/1983 | de Waal |
| 4,685,942 A | 8/1987 | Klassen et al. |
| 4,696,442 A | 9/1987 | Mazzitelli |
| 5,074,751 A * | 12/1991 | Sixsmith ..................... 415/204 |
| 5,078,341 A | 1/1992 | Bichler et al. |
| 5,116,251 A | 5/1992 | Bichler et al. |
| 5,327,940 A | 7/1994 | Presz, Jr. |
| 5,655,359 A | 8/1997 | Campbell et al. |
| 5,807,073 A * | 9/1998 | Jensen et al. ............... 415/203 |

FOREIGN PATENT DOCUMENTS

| | | |
|---|---|---|
| DE | 842 561 C | 6/1952 |
| DE | 4003940 C1 * | 10/1990 |
| EP | 0 955 456 A | 11/1999 |
| GB | 948 446 A | 2/1964 |
| WO | WO 01 62592 A | 8/2001 |

* cited by examiner

Primary Examiner—Edward K. Look
Assistant Examiner—Igor Kershteyn
(74) Attorney, Agent, or Firm—Robert Desmond, Esq.

(57) ABSTRACT

A swirl generator for creating bulk swirl in a compressor plenum in the opposite direction to the direction of rotation of the compressor rotor. The generator includes a continuous flow passageway formed by an inlet duct and a compressor forming an angle in the range of about 0°–180° to one another. A non-uniform velocity gradient is created by forming an area of non-uniform cross-sectional area within the flow passageway. The non-uniform area may comprise a ramp with a tapered end line, a rounded line of intersection, a fillet or by lengthening one side wall of the inlet duct relative to the opposite side wall. Preferably, the non-uniform cross sectional area uniformly tapers from ones sidewall of the flow passageway to the opposite sidewall.

18 Claims, 5 Drawing Sheets

PLENUM ENTRY BULK SWIRL GENERATOR

BACKGROUND OF THE INVENTION

The present invention generally relates to an Auxiliary Power Unit (APU) system of the type utilized for starting a jet engine and providing environmental control for commercial aircraft. More particularly, the present invention is directed to an inlet duct and interfacing plenum capable of significantly reducing Exhaust Gas Temperature (EGT) which directly translates to reducing Turbine Inlet Temperature (TIT) and, consequently, increasing APU turbine life.

It has been observed in prior systems that plenums that receive uniform airflow tend to produce a pair of vortices that cause a 2 per rev mechanical and aerodynamic distortion at the compressor eye 10 as shown in FIG. 1. For each revolution of the compressor 12, a blade leading edge 14 experiences a reversal of flow incidence two separate times. This distortion causes a decrement in compressor performance that leads to increased TIT and ultimately reduced turbine life as well as reduced operating efficiency of the APU.

Compressors prefer a reasonable amount of counter-rotating bulk swirl. Any non-uniform flow entering a plenum generates bulk swirl. Air having a controlled velocity profile entering the plenum can be used to create such a favorable counter-rotating bulk swirl. It has been further observed that a simple straight-walled inlet duct that turns substantially 90° into a plenum tends to produce a uniform plenum flow resulting in the reduced life of the turbine blades and ultimately the APU system.

There is a need for a bulk swirl generator having an inlet into a plenum that generates air flow having a predictable and prescribed velocity gradient entering the plenum and that assures the desirable bulk swirl is maintained within an APU plenum to reduce EGT and ultimately TIT in order to maximize life of the turbine blades.

SUMMARY OF THE INVENTION

In one aspect of the present invention, a bulk swirl generator comprises an airflow passageway leading to an APU plenum, which feeds to a compressor. The passageway creates a non-uniform air flow profile or gradient entering the compressor. In particular, a tapered ramp extends across the width of an inlet duct at the interface of the duct and the APU plenum. The ramp has a maximum turn radius located at one side of the inlet duct, steadily decreasing in radius or taper until a sharp corner is formed at the opposite side of the inlet duct. The turn angle of the radius is preferably between about 45°–90°. The tapered ramp creates the non-uniform velocity gradient across the mouth of the compressor plenum with the greater velocity existing at the side of the plenum inlet duct having the greatest turn radius. The intersecting surfaces of the inlet duct and the plenum oppositely disposed from the ramp form an angle of substantially 90°. The velocity of the stream of air entering the plenum steadily decreases as the radius of the ramp decreases, creating a non-uniform velocity gradient entering the plenum. This, in turn, creates the desired bulk swirl in the opposite direction to the rotation of the compressor rotor.

In another aspect of the invention, an air flow passageway comprises a compressor plenum and attached inlet duct wherein a fillet is created at the interface between the inlet duct and the mouth of the plenum. The fillet tapers from a maximum radius at one side of the inlet duct to a sharp corner at the other side of the inlet duct. The opposite interface between the inlet duct and plenum forms an angle of approximately 90°. The tapering fillet creates a non-uniform velocity gradient entering the plenum that, in turn, creates the desirable bulk swirl flow in the direction opposite to the rotation of the compressor rotor.

In still another aspect of the invention, a flow passageway generator includes a rounded interface between the inlet duct and the compressor plenum. The rounded interface uniformly tapers from having a maximum radius at one side of the inlet duct to having a sharp corner at the other side of the inlet duct. The inlet duct and plenum interface oppositely disposed from the rounded interface form an angle of substantially 90°. This configuration creates a flow passageway having a non-uniform gradient wherein the maximum airflow velocity is created adjacent the portion of the rounded interface having the maximum radius; with the air flow velocity decreasing toward the opposite side with the sharp radius or corner.

In a further aspect of the present invention, a generator comprises an air flow passageway wherein a ramp is disposed in the wall of a compressor plenum, with the ramp extending upstream towards the interface with an inlet duct attached to the plenum. The leading edge of the ramp extends across the mouth of the plenum and is formed with a maximum turn radius located at one side of the plenum. The turn radius steadily decreases in radius or taper until reaching a sharp corner at the opposite side of the plenum. The interface inlet duct and plenum interface opposite the ramp forms an angle of substantially 90°. The radius of the ramp turn angle is preferably between about 45°–90°. During operation, air flows through the inlet duct and across the plenum ramp toward the compressor rotor. The tapered ramp creates a non-uniform velocity gradient that, in turn, creates the desirable bulk swirl in the opposite direction to the rotation of the compressor rotor. The bulk swirl reduces the EGT and ultimately the TIT, significantly increasing the life of the APU turbine blades as well as improving the operating efficiency of the APU by decreasing the amount of fuel needed to run the system.

These and other features, aspects and advantages of the present invention will become better understood with reference to the following drawings, description and claims.

DETAILED DESCRIPTION OF THE INVENTION

The following detailed description is of the best currently contemplated modes of carrying out the present invention. The description is not to be taken in a limiting sense, but is made merely for the purpose of illustrating the general principles of the invention, since the scope of the invention is best defined by the appended claims.

Figure 1:
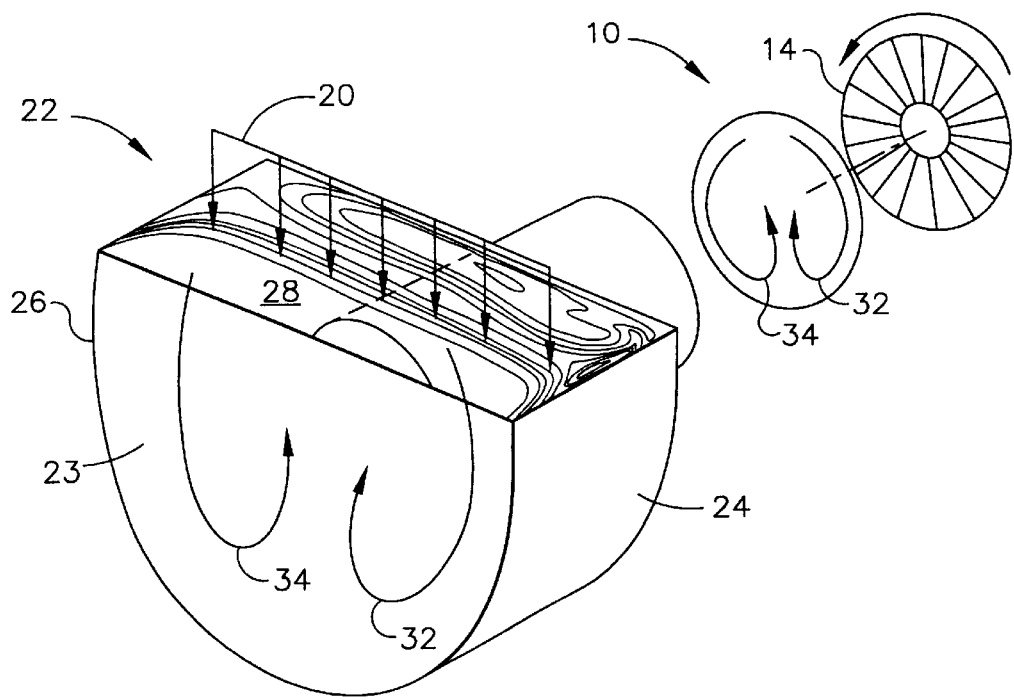
FIG. 1 is a perspective view of a uniform velocity flow gradient at the entry of a compressor plenum in a prior art design.
Figure 2:
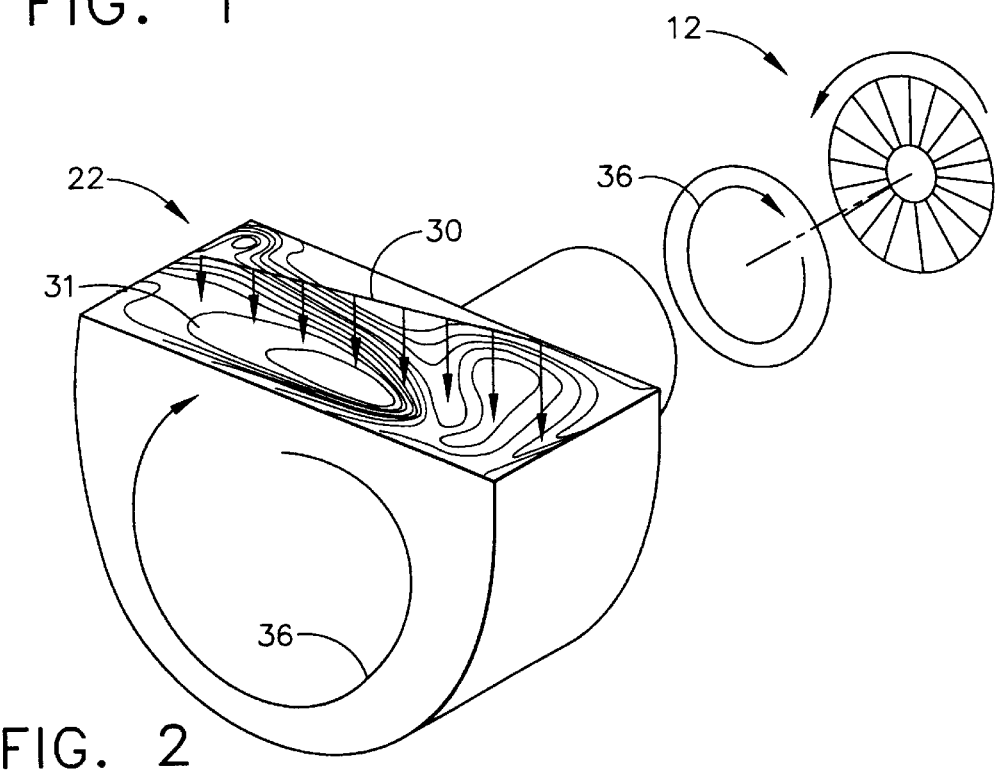
FIG. 2 is a perspective view of a non-uniform velocity flow gradient at the entry of a compressor plenum in accordance with the present invention.

Referring again to FIG. 1 that depicts a prior art design, the uniform velocity gradient is identified by arrows 20 of equal length across the mouth of plenum 22. Because the flow into plenum 22 is substantially uniform, the flow velocity from a first side 24 to a second side 26 is substantially constant as identified at 28. In particular, the rectangular shape of the pressure contour indicative of constant velocity extends across the entire width of plenum 22. In contrast, a non-uniform flow into plenum in FIG. 2 in accordance with the present invention is represented by arrows 30 of decreasing lengths across the mouth of plenum 22. This creates a velocity contour of generally elliptical shape 31, having the bulk of contour located where the arrows 30 are of minimum length, indicating reduced velocity. The primary difference between the flow through plenum 22 in FIGS. 1 and 2 is the creation of secondary flows that will directly affect a compressor 12.

As discussed above, the uniform velocity gradient 20 in FIG. 1 creates a pair of counter-rotating vortices 32 and 34 that create a 2 per rev mechanical and aerodynamic distortion to a compressor rotator 12 regardless of its direction of rotation. In comparison, if the non-uniform velocity gradient 30 decreases from first side 24 to second side 26 of plenum 22 and compressor rotator 12 rotates in the counter-clockwise direction shown in FIG. 2, a counter swirl 36 is created in the direction counter to the direction of rotation of compressor rotator 12. This counter swirl 36 has shown to significantly improve compressor performance thereby reducing EGT substantially (i.e., about 10–14° F.).

Figure 3:
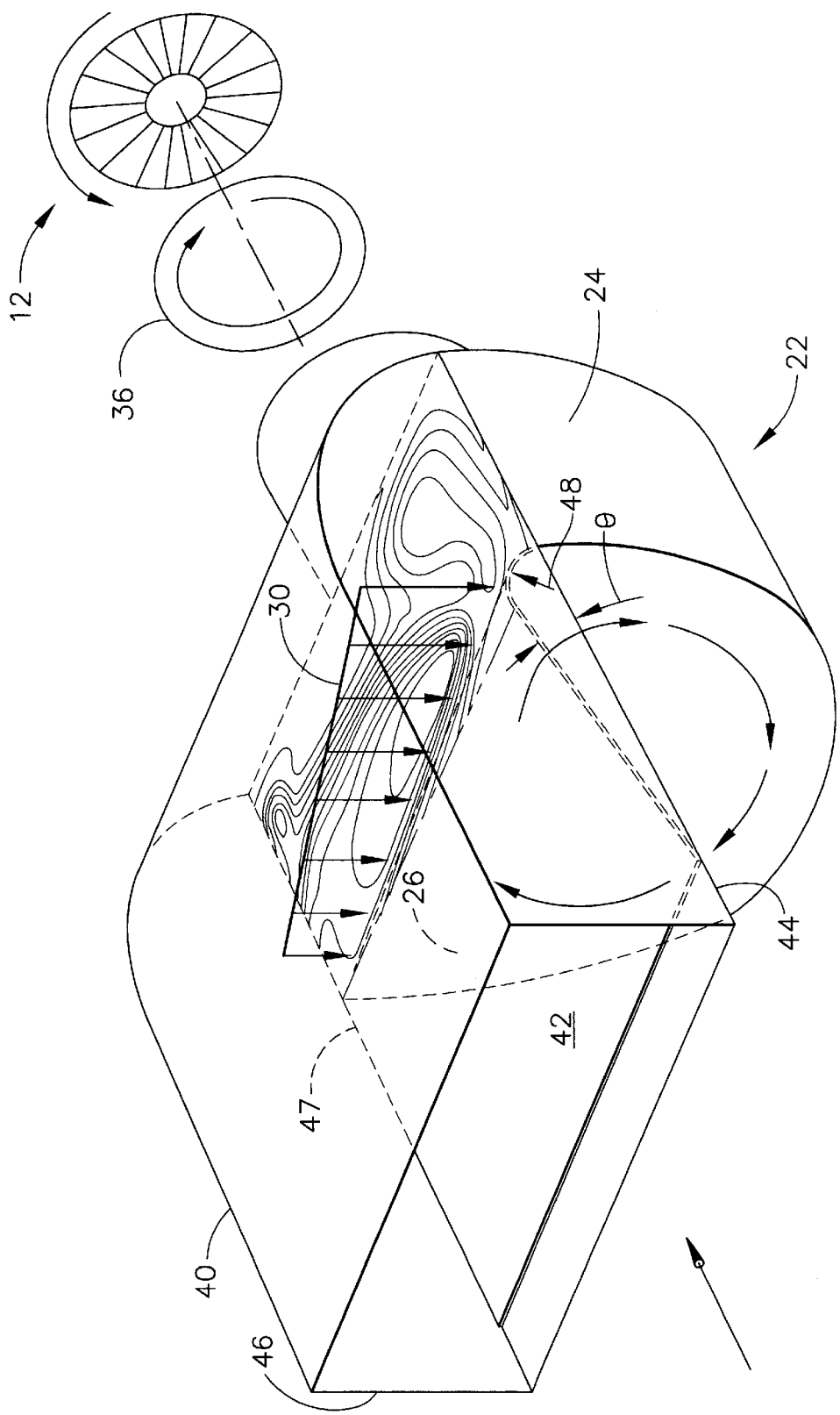
FIG. 3 is a perspective view of an inlet duct and plenum formed in accordance with the present invention.
Figure 4:
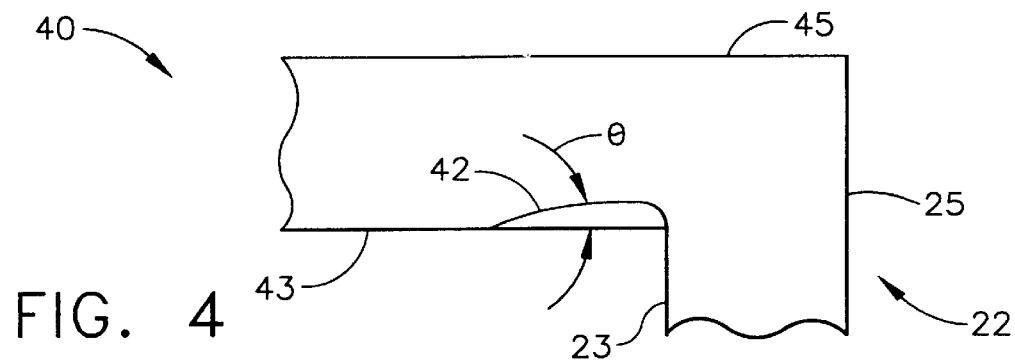
FIG. 4 is a cross-sectional view of inlet duct and plenum formed in accordance with the embodiment of FIG. 3.

Turning now to FIGS. 3 and 4, an inlet duct 40 extends at substantially about 90° to an intersection with a mouth of a compressor plenum 22. However, the scope of the present invention is considered to include an inlet duct 40 and attached plenum 22 that form any angle up to about 180°. In order to achieve the desired non-uniform velocity gradient 30, a ramp 42 extends within inlet duct 40 in the direction of the mouth of plenum 22 as formed by plenum sidewalls 24 and 26, bottom wall 23, and top wall 25, respectively. Ramp 42 extends from a first sidewall 44 of inlet duct 40 to a second, opposite sidewall 46. It is noted that velocity gradient 30 decreases in value from side wall 44 to side wall 46 in FIG. 3, thus creating the elliptical area 31 of low velocity toward the side 26 of plenum 22.

Ramp 42 is preferably formed with an angle φ of substantially about 8 to 10° rise compared with wall 43 of inlet duct 40. The maximum radius of curvature 48 of ramp 42 as measured from bottom wall 43 is located adjacent to side wall 44 and is preferably about 10% to 25% of the height of side wall 44, while a minimum radius is located adjacent an opposite wall 46 and is preferably a close to 0 as possible to create a sharp corner between inlet duct 40 and plenum 22. The radius of curvature 48 steadily decreases in value from its maximum value until approaching side wall 46 where it makes a sharp, substantially 90° corner with plenum 22, as denoted at 47.

It is to be understood that if compressor rotator 12 were to rotate in the opposite, or clockwise direction, the velocity gradient 30 should also run in the opposite direction wherein the largest value is adjacent side wall 46 and the smallest value adjacent side wall 44. This would mean that ramp 42 would have the greatest radius of curvature 48 adjacent to side wall 46 and a sharp corner adjacent side wall 44.

Regardless of the direction of the taper of ramp 42, some of the air will closely follow the curved ramp 42 while other air will separate at the sharp corner between inlet duct 40 and plenum 22. By tapering the ramp 42 as discussed, inlet duct 40 creates the non-uniform velocity and flow gradient 30 in the same direction as the taper, as well as the direction of rotation of compressor rotator 12. While the ramp 42 is shown extending outwardly from a bottom side 43 of inlet duct 40 (FIG. 4), it is well within the scope of the present invention to position ramp 42 on the opposite or topside 45 of inlet duct 40. present invention to position ramp 42 on the opposite or topside 45 of inlet duct 40.

Figure 6:
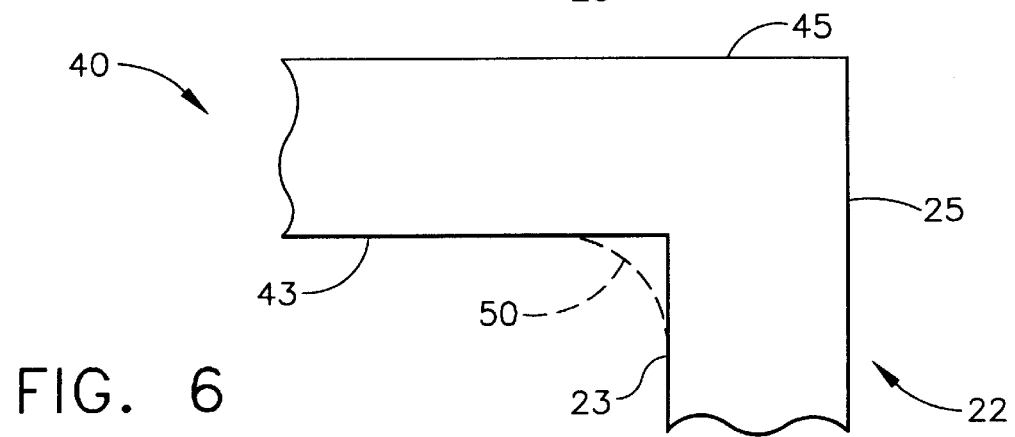
FIG. 6 is a cross-sectional view of the inlet duct of FIG. 5 formed in accordance with the present invention.
Figure 5:
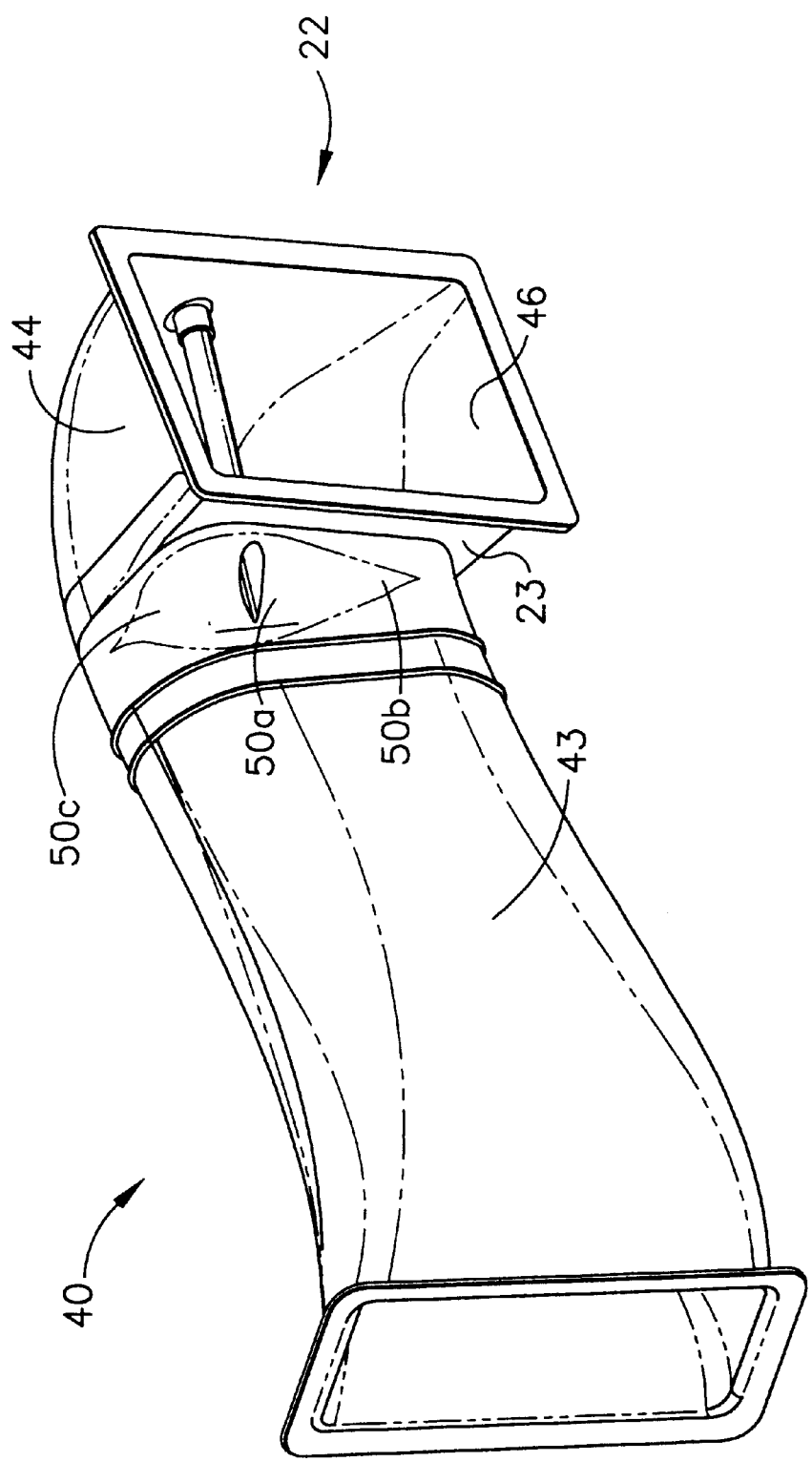
FIG. 5 is a perspective view of a further inlet duct formed in accordance with the present invention.

In another aspect of the invention, the favorable bulk swirl in the plenum 22 may be created by filleting the intersection between plenum side 23 and bottom side 43 of inlet duct 40. As shown in FIGS. 5 and 6, a fillet 50 extends between inlet bottom side 43 and plenum side 23. The fillet 50 has its maximum radius at the intersection of inlet sidewall 44 and inlet bottom wall 43 as best shown at 50a in FIG. 5. The radius of curvature of fillet 50 steadily decreases or tapers from a value at 50a to lesser values at the intersection of side wall 46 and bottom wall 43, identified at 50b and in the direction of the top wall 45 of inlet 40 identified as 50c. The taper should smoothly blend in with the adjacent walls 43 and 23 of duct 40 and plenum 22, respectively. The maximum radius of curvature of the fillet 50 located at 50a would be about 10%–25% of the height of adjacent side wall 44, while the minimum radius of curvature at 50b would be as close to 0 as practical to create a sharp corner of substantially 90° between inlet duct bottom wall 43 and plenum wall 23.

Figure 7:
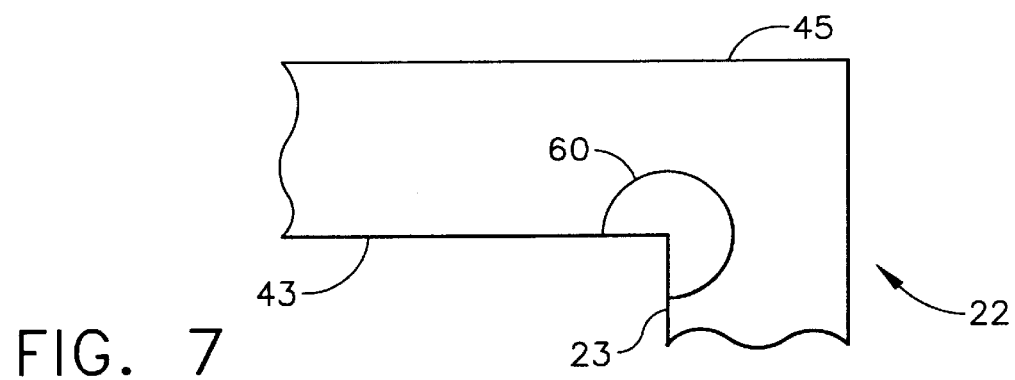
FIG. 7 is a cross-sectional view of another inlet formed in accordance with the present invention.

In a yet further aspect of the present invention shown in FIG. 7, the non-uniform flow gradient across the mouth of plenum 22 is formed by rounding the intersecting walls 43 of inlet duct 40 and 23 of plenum 22. The rounded line of intersection 60 would taper between a fully rounded configuration adjacent inlet duct sidewall 44 to a sharp corner adjacent sidewall 46. The maximum radius of curvature of the rounded line of intersection 60 would be about 10%–25% of the height of adjacent side wall 44, while the minimum radius of curvature adjacent side wall 46 would be as close to 0 as practical to create a sharp corner of substantially 90° between inlet duct bottom wall 43 and plenum wall 23.

Figure 8:
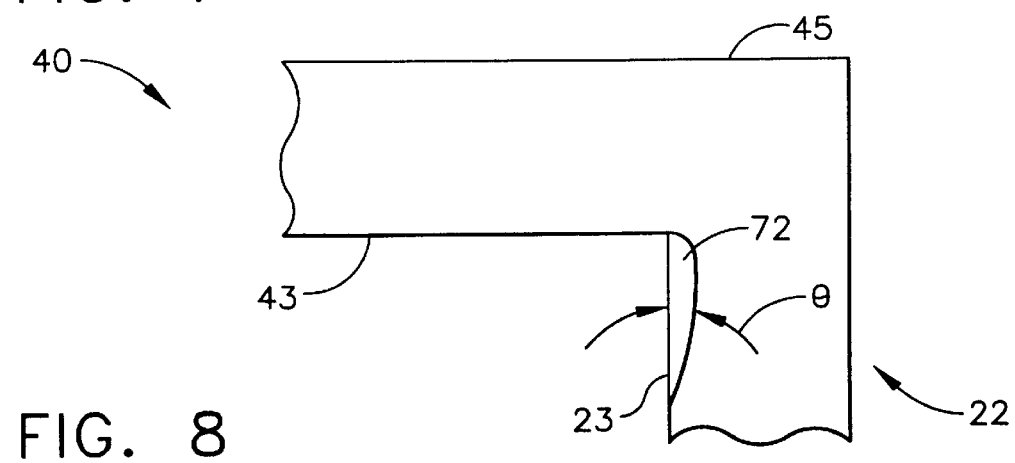
FIG. 8 is a cross-sectional view of yet another inlet formed in accordance with the present invention.

Attention is respectfully directed to FIG. 8, wherein a further aspect of the invention is shown. A ramp 72, somewhat similar to ramp 42 in FIG. 3, is positioned on the side 23 of plenum 22 facing toward the line of intersection with inlet duct 40. Ramp 72 relies on the Coanda effect which states that flow will naturally follow a curved surface. Ramp 72 would preferably taper from having a maximum radius adjacent to the sidewall 24 of plenum to a sharp corner adjacent to the side 26 of plenum 22. Ramp 72 preferably forms an angle φ of substantially about 8 to 10° rise compared with wall 23 of plenum 22. The maximum radius of curvature of ramp 72 is preferably about 10% to 25% of the height of sidewall 24 of plenum 22, while the minimum radius of curvature is as close to 0 as practical at a location adjacent to sidewall 26 of plenum 22.

Figure 9:
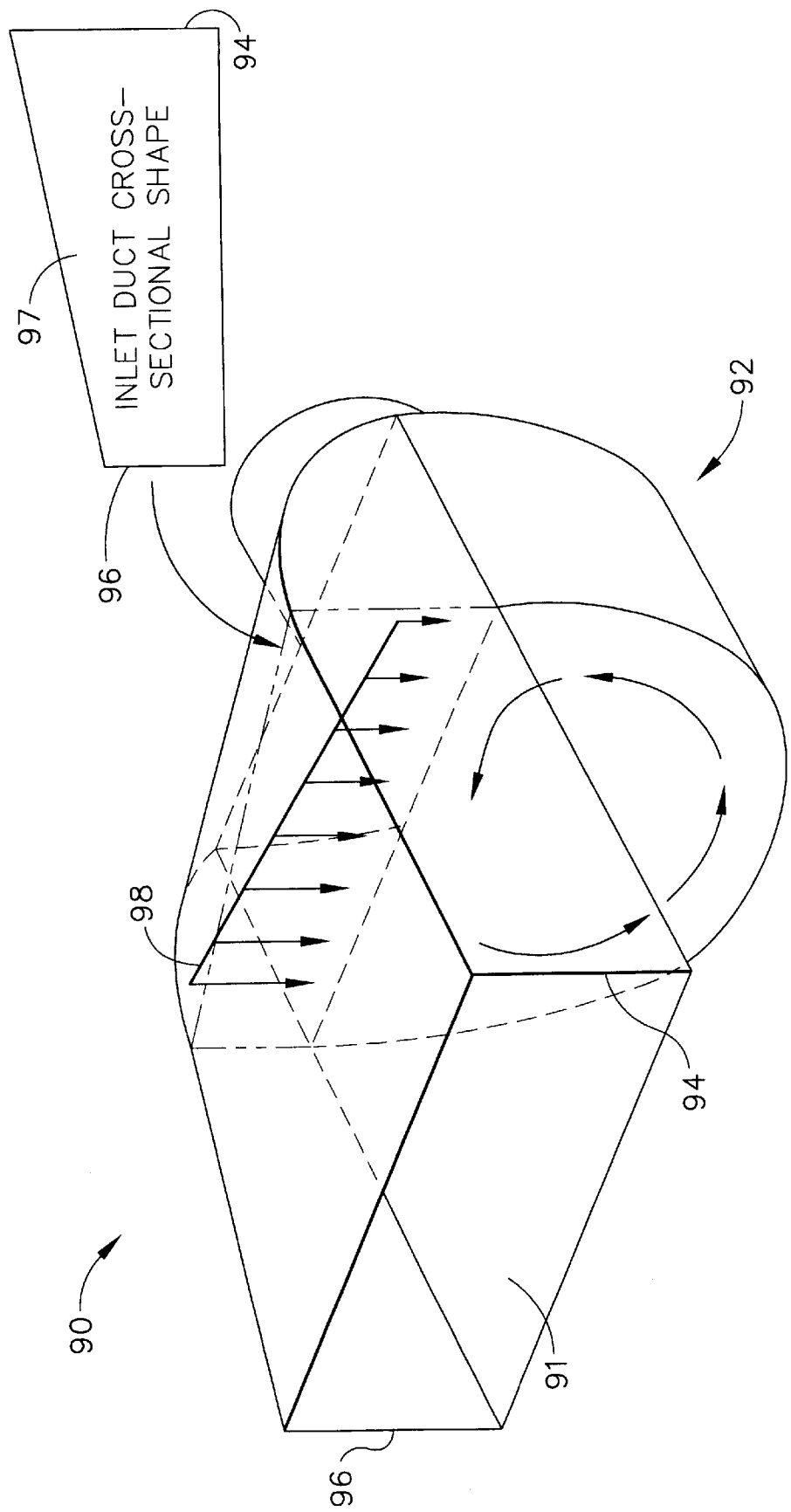
FIG. 9 is a perspective view of yet another inlet formed in accordance with the present invention.

Attention is directed to FIG. 9, wherein a further aspect of the present invention is shown. The inlet duct 90 forms a substantially right angle of 90° with plenum 92. At the entryway to duct 90, the sidewalls 94 and 96 are similar in shape and size. This creates a rectangular cross-sectional area 91 of uniform shape. However, proceeding through duct 90, sidewall 96 gradually narrows relative to sidewall 94. The cross-sectional shape of duct 90 varies from that of a uniform rectangle 91 at the entry to a non-uniform shape 97 at the intersection with plenum 92. In particular, the cross-sectional area 97 of inlet duct 90 tapers from side 94 to side 96. When air flows through duct 90 into plenum 92, a non-uniform velocity profile gradient 98 is created which generates the desired bulk swirl within plenum 92.

Each of the aspects of the present invention alters the airflow gradient by varying the shape of a line of intersection between the duct and plenum. At one location along the interface, the duct and plenum have intersecting walls that meet along a radius of curvature. At another location, the walls meet in a sharp corner. The line of intersection tapers in a uniform manner from the rounded intersection to the square edge. This taper changes the air flow passageway which causes a corresponding change in the flow velocity of the air flowing from the inlet duct into plenum before encountering compressor rotator. The non-uniform gradient created in the plenum causes desirable bulk swirl flow, reducing exhaust gas temperature and ultimately turbine inlet temperature, thus increasing turbine blade life and overall performance of the APU.

It should be understood, of course, that the foregoing relates to preferred embodiments of the invention and that modifications may be made without departing from the spirit and scope of the invention as set forth in the following claims.

We claim:

1. A swirl generator for creating a bulk swirl in the opposite direction of rotation of a compressor rotor, comprising:
   a hollow airflow passageway for directing a stream of air into contact with the compressor rotor;
   said flow passageway including a wall portion of variable radius, tapering from a maximum radius to a lesser radius of curvature, thereby creating a non-uniform air flow gradient in the passageway, resulting in an oppositely rotating bulk swirl acting against the compressor rotor;
   wherein the hollow airflow passageway comprises a compressor plenum disposed upstream of the compressor rotor and an air flow inlet duct attached to an inlet mouth of the plenum and forming an angle in the range of about 0°–180° with the compressor plenum;
   wherein the wall portion is formed at an intersection of the inlet duct and the compressor plenum, and includes a tapered fillet having a maximum radius of curvature adjacent one side wall of the inlet duct and a sharp corner adjacent an opposite side wall of the inlet duct.

2. The swirl generator of claim 1, wherein the wall portion is formed in the inlet duct and includes a ramp extending to an interface with the compressor plenum, with the ramp extending across the inlet duct and including a down stream end having a tapered radius of curvature with a maximum radius adjacent one side wall of the inlet duct and a minimum radius adjacent an opposite side wall of the inlet duct.

3. The swirl generator of claim 2, wherein the minimum radius of curvature comprises a sharp corner at the interface between the inlet duct and the compressor plenum.

4. The swirl generator of claim 2, wherein an angle of inclination φ of the ramp to a bottom wall of the inlet duct is about 8° to 10°.

5. The swirl generator of claim 2, wherein the ramp has a maximum radius of curvature in the range of about 10%–25% of the height of the one sidewall of the inlet duct.

6. The swirl generator of claim 1, wherein the inlet duct and the compressor plenum form an angle of substantially 90°.

7. A swirl generator for creating a bulk swirl in the opposite direction of rotation of a compressor rotor, comprising:
   a hollow airflow passageway for directing a stream of air into contact with the compressor rotor;
   said flow passageway including a wall portion of variable radius, tapering from a maximum radius to a lesser radius of curvature, thereby creating a non-uniform air flow gradient in the passageway, resulting in an oppositely rotating bulk swirl acting against the compressor rotor;
   wherein the hollow airflow passageway comprises a compressor plenum disposed upstream of the compressor rotor and an air flow inlet duct attached to an inlet mouth of the plenum and forming an angle in the range of about 0°–180° with the compressor plenum;
   wherein the wall portion is formed at an intersection of the inlet duct and the compressor plenum, and includes a rounded line of intersection having a maximum radius of curvature at adjacent one side wall of the inlet duct and tapering to a minimum radius of curvature adjacent an opposite side wall of the inlet duct.

8. A swirl generator for creating a bulk swirl in the opposite direction of rotation of a compressor rotor, comprising:
   a hollow airflow passageway for directing a stream of air into contact with the compressor rotor;
   said flow passageway including a wall portion of variable radius, tapering from a maximum radius to a lesser radius of curvature, thereby creating a non-uniform air flow gradient in the passageway, resulting in an oppositely rotating bulk swirl acting against the compressor rotor;
   wherein the hollow airflow passageway comprises a compressor plenum disposed upstream of the compressor rotor and an air flow inlet duct attached to an inlet mouth of the plenum and forming an angle in the range of about 0°–180° with the compressor plenum;
   wherein the wall portion is formed in the plenum and includes a ramp extending toward the inlet duct, with the ramp having a maximum radius of curvature located adjacent one side of the plenum and a minimum radius of curvature adjacent an opposite side of the plenum.

9. An inlet duct and a compressor plenum assembly form an angle in the range of about 0°–180° for generating bulk swirl in a compressor disposed downstream of the plenum, comprising:
   a continuous flow passageway extending through the inlet duct and compressor plenum;
   the continuous flow passageway having a portion of non-uniform cross-sectional area extending between opposite side walls; and
   the portion of non-uniform cross-section changing from a location of minimum cross-sectional area at one side wall of the flow passageway to a point of maximum cross-sectional area at an opposite side wall of the flow passageway to create a non-uniform flow gradient, causing bulk swirl downstream in the compressor in the opposite direction to the direction of rotation of the compressor rotor;

wherein the non-uniform cross-sectional area comprises a fillet formed at an intersection of the inlet duct and the compressor plenum, the fillet having a maximum radius of curvature adjacent one side wall of the inlet duct and a minimum radius of curvature adjacent an opposite side wall of the inlet duct.

10. The flow passageway assembly of claim 9, wherein the non-uniform cross-sectional area comprises a ramp located in the inlet duct flow passageway and having a rounded end forming an intersection with the compressor plenum.

11. The flow passageway assembly of claim 10, wherein the ramp has a minimum radius of curvature at one end that forms a sharp corner of substantially 90° between the inlet duct and the compressor plenum.

12. The flow passageway assembly of claim 10, wherein the ramp has a maximum radius of curvature in the range of about 10%–25% of the height of a sidewall of the inlet duct.

13. An inlet duct and a compressor plenum assembly form an angle in the range of about 0°–180° for generating bulk swirl in a compressor disposed downstream of the plenum, comprising:
 a continuous flow passageway extending through the inlet duct and compressor plenum;
 the continuous flow passageway having a portion of non-uniform cross-sectional area extending between opposite side walls; and
 the portion of non-uniform cross-section changing from a location of minimum cross-sectional area at one side wall of the flow passageway to a point of maximum cross-sectional area at an opposite side wall of the flow passageway to create a non-uniform flow gradient, causing bulk swirl downstream in the compressor in the opposite direction to the direction of rotation of the compressor rotor;
 wherein the non-uniform cross-sectional area comprises a rounded line of intersection between the inlet duct and the compressor plenum, with the rounded line having a maximum radius of curvature adjacent one side of the inlet duct and a minimum radius of curvature adjacent a opposite side wall of the inlet duct.

14. An inlet duct and a compressor plenum assembly form an angle in the range of about 0°–180° for generating bulk swirl in a compressor disposed downstream of the plenum, comprising:
 a continuous flow passageway extending through the inlet duct and compressor plenum;
 the continuous flow passageway having a portion of non-uniform cross-sectional area extending between opposite side walls; and
 the portion of non-uniform cross-section changing from a location of minimum cross-sectional area at one side wall of the flow passageway to a point of maximum cross-sectional area at an opposite side wall of the flow passageway to create a non-uniform flow gradient, causing bulk swirl downstream in the compressor in the opposite direction to the direction of rotation of the compressor rotor;
 wherein the non-uniform cross-sectional area comprises a ramp located in the plenum flow passageway and having a rounded end forming an intersection with the inlet duct, with the rounded end having a maximum radius of curvature at one side wall of the plenum and steadily tapering to a minimum radius of curvature at an opposite side wall of the plenum.

15. A swirl generator for creating bulk swirl in the opposite direction of rotation of a compressor rotor, comprising:
 an inlet duct joined to a compressor plenum at an angle in the range of about 0°–180° to form a continuous flow passageway through the inlet duct into the plenum;
 a ramp extending between opposite side walls of the inlet duct;
 the ramp having a non-uniform radius of curvature adjacent the plenum;
 the non-uniform radius of curvature tapering from a portion having a maximum radius of curvature located adjacent one inlet duct side wall to a minimum radius of curvature located adjacent an opposite side wall of the inlet duct for creating a stream of air having a non-uniform velocity gradient in the plenum which is capable of producing bulk swirl in a direction opposite to a direction of rotation of the compressor rotor.
 wherein the minimum radius of curvature comprises a sharp corner at an interface between the inlet duct and the compressor plenum.

16. The swirl generator of claim 15, wherein an angle of inclination φ of the ramp to bottom wall of the inlet duct is between about 8° to 10°.

17. The swirl generator of claim 15, wherein the maximum radius of curvature is in the range of about 10%–25% of the height of the adjacent side wall of the inlet duct.

18. A swirl generator for creating bulk swirl in the opposite direction of rotation of a compressor rotor, comprising:
 an inlet duct joined to a plenum compressor to create a continuous flow passageway;
 the inlet duct having a non-uniform cross-sectional area;
 wherein the non-uniform cross-sectional area comprises a fillet formed at an intersection of the inlet duct and the compressor plenum; and
 the cross-sectional area tapering from an area of maximum cross-sectional area to an area of minimum cross-sectional area, creating non-uniform velocity in the plenum for generating bulk swirl in the compressor in a direction opposite to the direction of rotation of the compressor rotor.

* * * * *